United States Patent [19]

Webbeking et al.

[11] Patent Number: 5,505,543
[45] Date of Patent: Apr. 9, 1996

[54] EMISSIVITY MEASUREMENT APPARATUS AND METHOD

[75] Inventors: Victor T. Webbeking, Seattle; Diane C. Rawlings, Bellevue; David F. King, Seattle; David J. Morris, Kent, all of Wash.

[73] Assignee: The Boeing Company, Seattle, Wash.

[21] Appl. No.: 148,556

[22] Filed: Jan. 21, 1994

[51] Int. Cl.⁶ .............................. G01N 25/00; G01J 5/00; G01J 5/52
[52] U.S. Cl. .................................. 374/9; 374/129
[58] Field of Search .............................. 374/9, 126, 129, 374/130, 153; 250/338.1, 341.6

[56] References Cited

U.S. PATENT DOCUMENTS

| | | | |
|---|---|---|---|
| 3,527,097 | 9/1970 | Deczky | 374/129 |
| 3,884,075 | 5/1975 | Brandli et al. | 374/129 |
| 4,433,924 | 2/1984 | Quinn, III | 374/129 |
| 4,566,809 | 1/1986 | Arnaud | 374/126 |
| 4,881,823 | 11/1989 | Tanaka et al. | 374/9 |
| 4,984,902 | 1/1991 | Crowley et al. | 374/126 |
| 5,186,541 | 2/1993 | Paulk | 374/126 |
| 5,308,161 | 5/1994 | Stein | 374/9 |

FOREIGN PATENT DOCUMENTS

| | | | |
|---|---|---|---|
| 0007527 | 1/1982 | Japan | 374/129 |
| 0030916 | 2/1982 | Japan | 374/9 |
| 0307367 | 8/1955 | Switzerland | 374/130 |

*Primary Examiner*—Diego F. F. Gutierrez
*Attorney, Agent, or Firm*—Christensen, O'Connor, Johnson & Kindness

[57] ABSTRACT

Method and apparatus for measuring thermal radiation emitted by a sample, and for determining emissivity. The apparatus comprises a chamber in which the sample may be positioned, the chamber comprising a plurality of walls including a first wall containing an observation port. The chamber is located in a cold environment, and the walls of the chamber are brought to a selected temperature by circulating a temperature conditioned fluid through the walls. The sample is moved along a movement axis within the chamber past the observation port. As the sample is so moved, radiation emitted outwards through the observation port by the sample is measured.

15 Claims, 6 Drawing Sheets

EMISSIVITY MEASUREMENT APPARATUS AND METHOD

FIELD OF THE INVENTION

The present invention relates to methods and apparatus for measuring the thermal emissivity of materials.

BACKGROUND OF THE INVENTION

All materials radiate (emit) energy at a rate and at wavelengths determined by the temperature of the material, and by a property of the material referred to as its emissivity. Emissivity is defined as the ratio of the power radiated by a material at a given temperature to the power radiated by a blackbody (a "perfect" emitter) at the same temperature. Emissivity depends on the temperature of the material, the angle from which the surface of the material is viewed, and on wavelength.

Figure 1A:
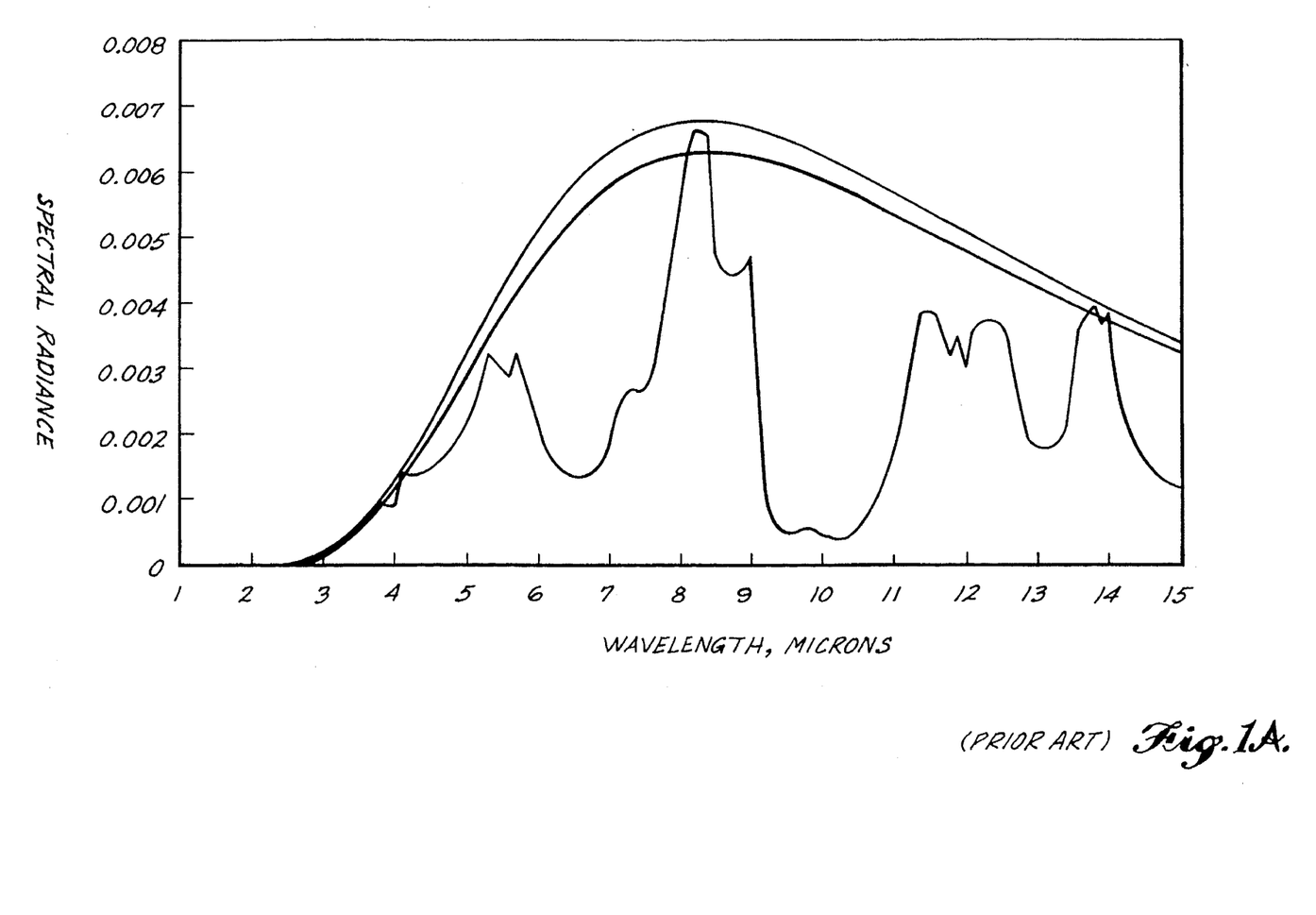
FIGS. 1A and 1B are graphs illustrating how the emissivity of a material is determined and FIG. 1C is a graph of temperature error at different material temperatures.
Figure 1B:
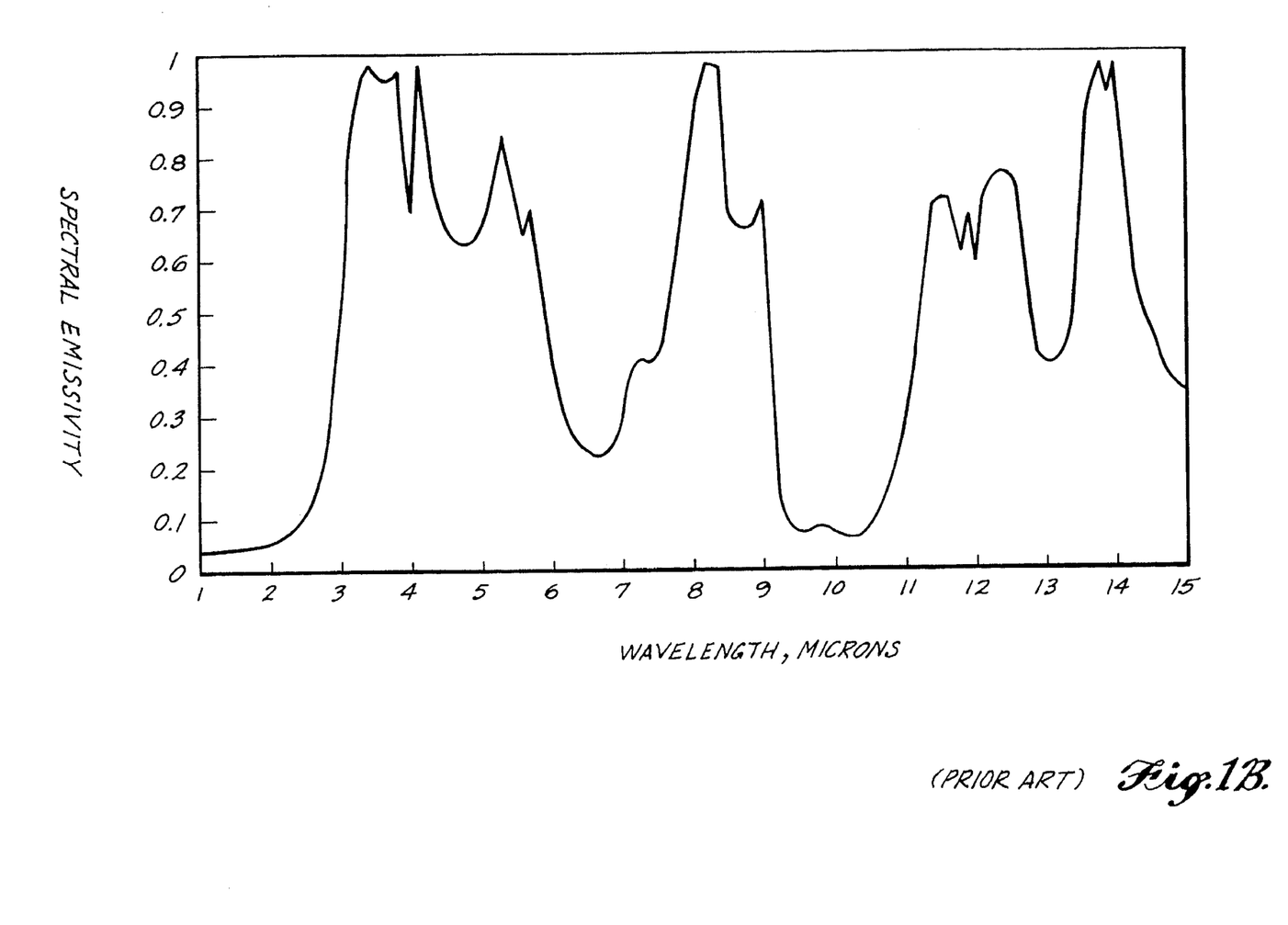

The general concept of emissivity is illustrated in FIGS. 1A and 1B. In FIG. 1A, curve 12 represents the spectral radiance (for example in watts/cm$^3$/steradian) of a material at a particular temperature, as a function of wavelength. Curve 14 represents the spectral radiance of a perfect blackbody at the same temperature. The emissivity of this material, represented by curve 16 in FIG. 1B, is the ratio of the radiance of the material (curve 12) to the radiance of the blackbody (curve 14). Since a blackbody is by definition a perfect radiator, the emissivities of passive materials are always less than one.

It is desirable for many reasons to be able to accurately and routinely measure the emissivities of a broad range of different materials. As examples, emissivity measurements are used for basic materials research, for calculating the infrared detectability of military targets, and for calculating thermal balances in aircraft, spacecraft and other structures and systems. At present, however, accurate emissivity measurements can be made only on a limited range of materials, for reasons explained below. Furthermore, within that range, extraordinary care must be taken with materials that do not have high values of thermal conductivity.

Figure 1C:
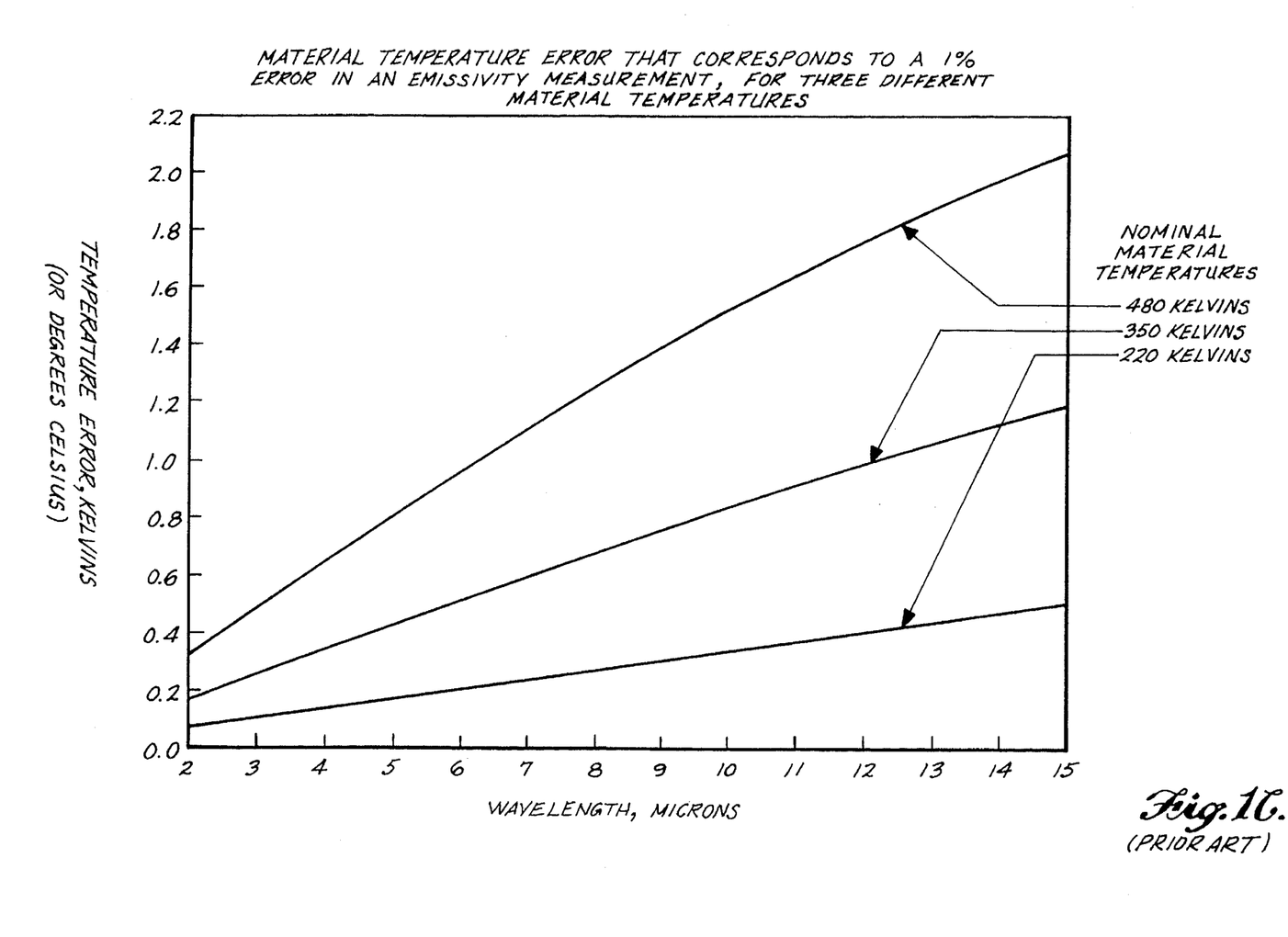

The fundamental problem in making an accurate emissivity measurement is that it is difficult to obtain a sufficiently accurate measurement of the temperature of the material at the region where radiation is emitted. The temperature must be known accurately because there is a large change in the power radiated by a material when its temperature changes by even a small amount. (For a blackbody, the total radiated power summed over all wavelengths depends on the fourth power of the absolute temperature.) This temperature sensitivity is illustrated by curve 18 in FIG. 1A. Curve 18 represents the spectral radiance that might be measured for a blackbody source having a temperature slightly lower than the target temperature for the emissivity measuremeier. The shift between curves 14 and 18 would introduce a large error in determination of emissivity. By way of example, to obtain one percent accuracy in an emissivity measurement at a wavelength of 6 microns of a material at 220 Kelvins (about −65° F.), temperature must be known to an accuracy of 0.2 Kelvins. The temperature accuracy required to obtain one percent accuracy in an emissivity measurement is shown as a function of wavelength in FIG. 1C for three different material temperatures.

In the past, the physical conditions under which emissivity measurements must be obtained have made accurate temperature measurement extremely difficult for some materials, and nearly impossible for most. To measure emissivity, the sample of material must generally be placed in an environment which is very cold relative to the material. This step is to ensure that thermal radiation from the surrounding environment is low enough so that the radiation originating from the environment and reflected or scattered by the material is negligible compared to radiation originating from the material itself. However, if the material sample is much warmer than the environment, then the sample will have a tendency to cool rapidly. To compensate for this tendency, there must be a constant flow of heat from within the material to the material's surface. However, heat flow within a material requires a temperature gradient as a driver. A material having a relatively low thermal conductivity might require a temperature gradient of several hundred degrees Celsius per inch to maintain a relatively moderate surface temperature in a cold environment.

Figure 2:
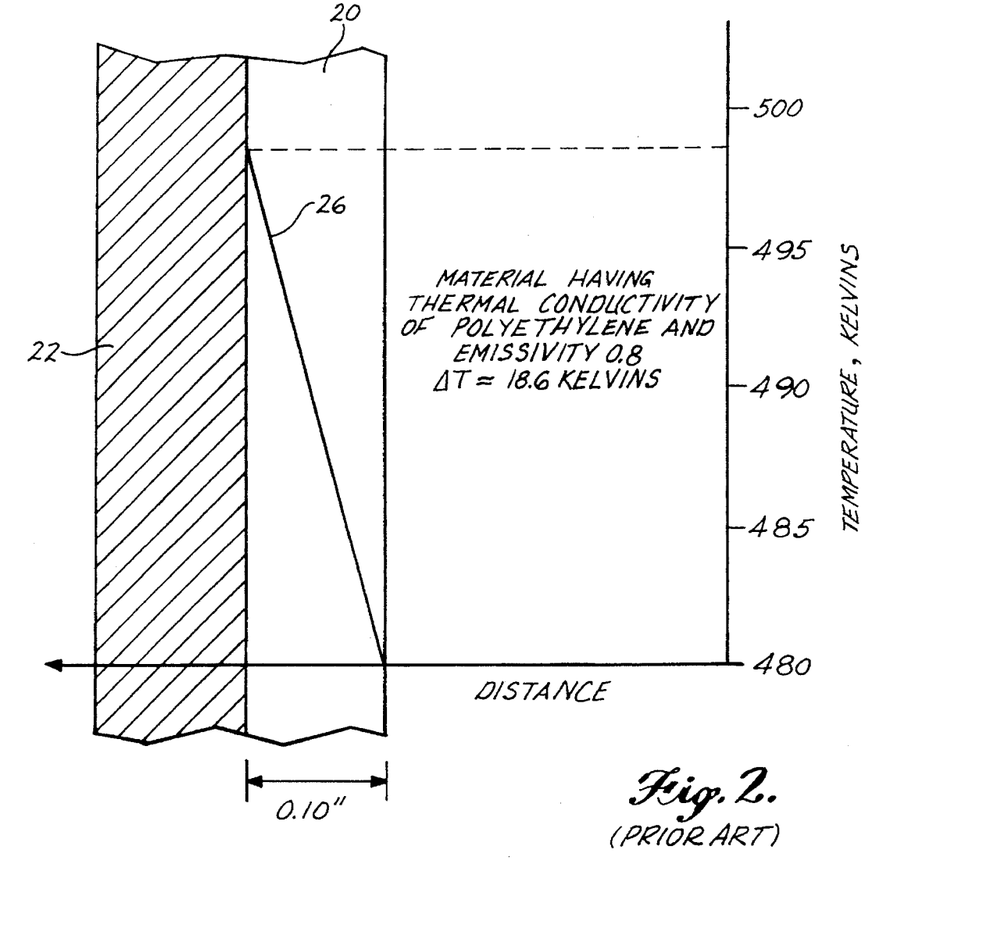
FIG. 2 is a schematic diagram and graph showing the temperature gradient near the surface of a material having a low thermal conductivity.

This temperature gradient problem is illustrated in FIG. 2. Assume that it is desired to measure the emissivity of a material having a low thermal conductivity, such as polyethylene. A material 20 is formed in a layer 0.1 inches thick on a metal substrate 22. A line 26 shows the temperature profile within material 20 that would be required to maintain a surface 24 of the material at a temperature of 480 Kelvins. As illustrated, a temperature gradient of about 18.6 Kelvins across a sample of thickness 0.1 inches would be required to compensate for radiative heat loss (assuming a surface emissivity of 0.8 with no return radiation from the surrounding environment). Under these conditions, it is not possible to obtain an accurate temperature measurement from a thermometer placed within the material, because the temperature within the material varies significantly from the surface temperature. It might appear that the solution to this problem would be to place the thermometer outside of material 20, touching its surface 24. However, such a thermometer will radiate energy at a rate characteristic of the thermometer material, rather than of the sample, and alter the heat flow balance necessary to maintain surface temperature. The act of measuring surface temperature would change the quantity being measured.

With existing technology, it is possible to measure the emissivity of some materials that have high thermal conductivities. For such materials, the temperature gradient required to maintain heat flow is sufficiently small so that adequate temperature accuracy can be obtained from a thermometer placed within the material.

It is also possible, with great difficulty, to measure the emissivity of a material having a low thermal conductivity if that material is opaque to thermal radiation at all wavelengths of interest. Thermal radiation emitted by an opaque material can be assumed to originate at the material surface. But the temperature of the material surface can be obtained accurately enough only through extremely precise measurements of heat flow through the material, thermal conductivity of the material, material thickness, and the temperature of the material back side (the equivalent with respect to FIG. 2 of the point where temperature is 498.6 Kelvins).

However, most materials having moderate or low thermal conductivities are not completely opaque to thermal radiation; and the degree of opacity or, conversely, of transparency, can vary considerably from one wavelength to another. Thermal radiation from such a material can originate within the body of the material, at varying distances from the material surface. Since these materials would contain a large temperature gradient under the necessary measurement environment, a unique temperature cannot be associated with the thermal radiation; and, a unique temperature is a necessary element of an emissivity measurement.

A solution to these problems is to place the material in an isothermal condition, that is, to make the material temperature constant everywhere within the material. In this case, a thermometer can be placed anywhere within the material (except near the surface of a material sufficiently non-opaque so that thermal radiation from the thermometer can reach the surface).

It might be thought possible to measure emissivity by placing a sample material in a thermal chamber until it has reached thermal equilibrium, i.e., an isothermal condition. The thermal chamber would then be opened for a period of time long enough to permit a measurement of the spectrum of radiation from the sample. Unfortunately, since the environment surrounding the thermal chamber must be very cold compared to the chamber, opening of the thermal chamber will cause the surface of the material to begin cooling too fast to permit accurate emissivity measurements. For example, it can be shown through thermal modeling that if a material sample has the same thermal properties (specifically, thermal diffusivity) as Teflon but an emissivity of 0.9, and if the sample is at a temperature of 480 Kelvins, then, through thermal radiation alone, the surface temperature of the sample will drop by about 0.41 Kelvins within 0.01 seconds after exposure of the sample to the cold external environment. This interval is far too brief to permit an accurate spectrum of the material to be measured.

SUMMARY OF THE INVENTION

The present invention solves the problems described above by making an emissivity measurement on a substantially isothermal sample, i.e., a sample that does not have internal temperature gradients. This measurement is made by traversing the sample past an observation port, to thereby minimize cooling during spectrum measurement.

A preferred apparatus of the present invention comprises a chamber in which a sample is positioned, the chamber comprising a plurality of walls including a first wall that contains an observation port through which the sample may be viewed. Means are provided for maintaining the walls of the chamber at a selected temperature. Means are also provided for moving the sample along a movement axis within the chamber, past the observation port. During such movement, the spectrum of radiation emitted by the sample outwards through the observation port is measured. o Preferably, the length of the observation port along the movement axis is substantially less than the length of the sample along the movement axis. These lengths, along with the speed of sample movement, may be adjusted to obtain a sufficiently long observation time for a spectrum measuring device, and a sufficiently short sample exposure time to prevent excessive material temperature drop.

DETAILED DESCRIPTION OF THE PREFERRED EMBODIMENT

Figure 3:
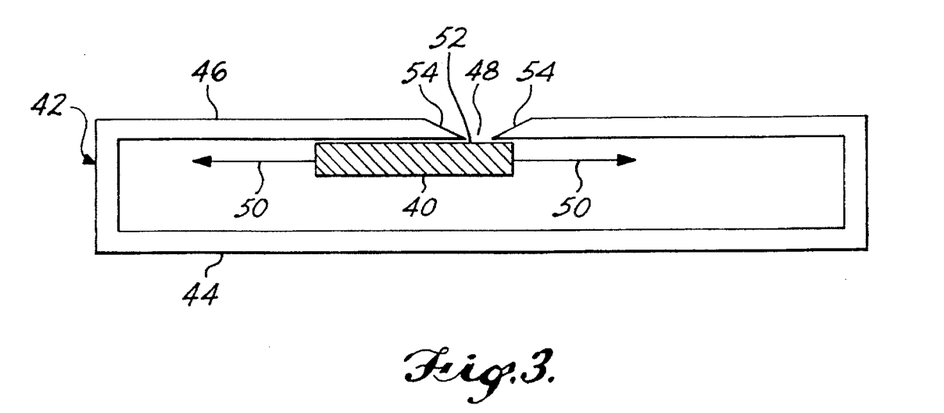
FIG. 3 is a schematic illustration of an emissivity measuring apparatus according to the present invention.

FIG. 3 schematically illustrates a preferred embodiment of the emissivity measurement apparatus and method of the present invention. A sample 40 of the material whose emissivity is to be measured is positioned within a thermal chamber 42. Chamber 42 comprises a plurality of walls 44 that include upper wall 46. The upper wall includes an observation port or slot 48. Means (not shown) are provided for maintaining the walls of chamber 42 at a predetermined temperature. Within the chamber, sample 40 is moved past observation slot 48, along a movement direction symbolized by arrows 50. Along the movement direction, the length of sample 40 is much greater than the length of slot 48.

In operation, the walls of chamber 42 are brought to a predetermined temperature, for example, using a circulating heating or cooling fluid. Sufficient time is allowed to elapse before the measurement to ensure that sample 40 is brought to the same temperature as the chamber walls, and that the sample temperature is uniform, i.e., there are no temperature gradients within the sample. The sample is then moved past observation slot 48 and radiation from the sample exiting through the slot is coupled by suitable optics to a spectrometer which measures radiation for a range of wavelengths. At any moment, while sample 40 is moved past observation slot 48, a portion of upper surface 52 of sample 40 is exposed to cold through the observation slot. However, for a given length of slot along the movement direction the exposure time of a given point on surface 52 can be limited by adjusting the speed of movement of the sample, to keep the surface temperature drop within accuracy limits, Once slot length and speed of movement are set, the observation time can be extended as required by the radiometer or spectroradiometer being used, by increasing the length of the sample along the movement direction.

The present embodiment of this invention uses a cryogenic Fourier transform infrared spectrometer (FTIR) to measure the spectral radiance (i.e. the radiance for a range of wavelengths of interest) of sample surface 52 as it passes by slot 48. If the sample is cold and of reasonable length, an FTIR or, generally, any spectroradiometer used to measure spectral radiance, cannot collect enough radiant energy during a single pass of the sample by the slot to produce a spectrum of moderate to high resolution at adequate signal-to-noise ratios. In this case, data from many passages of the sample past the slot must be averaged, or co-added. Successive positions of surface 52 drop slightly in temperature as they pass slot 48. Once the entire sample has passed the slot, it is brought to rest near the end o of chamber 42. There it begins reabsorbing heat energy. Cover plates (not shown) are attached at each end of the frame (also not shown) which holds sample 40. When the sample is at rest at either end of chamber 42, the cover plates close off slot 48, to very nearly eliminate loss of heat from the interior of chamber 42 through the slot. The sample is held at rest near an end of chamber 42 until its temperature rises arbitrarily close to its starting value. Then the sample is moved past the slot again, and more data is collected for averaging or co-adding.

In summary, in the method described above and depicted in FIG. 3, temperature accuracy is obtained by bringing sample 40 to an isothermal condition, so that a thermometer (not shown) placed anywhere within the sample will give the temperature of sample surface 52. The isothermal condition is obtained by placing the sample within, and near the end of an enclosure 42, which acts as an oven or cooler. A cover plate (not shown) blocks slot 48 while the sample 40 is reaching thermal equilibrium. A measurement of spectral radiance is obtained while the sample is moved past observation slot 48. Any arbitrary point on sample surface 52 begins cooling as it begins its passage across the slot, because of its exposure to the very cold external environment. But the temperature drop of that point is kept well within accuracy requirements by keeping the exposure time of the sample to the environment exposed through the slot very short. The length of time required to collect radiant energy for a single measurement is obtained through sample movement, which continuously brings fresh un-cooled material into view.

In the arrangement shown in FIG. 3, heat can pass from the chamber walls to the sample by the usual three forms of heat transfer: conduction, convection, and radiation. When the sample passes the slot, heat can be passed from the sample surface to the cold external environment by the same three forms. But it is necessary that convection effects at the sample surface be made negligible to eliminate temperature variations that would otherwise be unacceptably high. For this reason, and another given below, the apparatus of FIG. 3 and its cold environment must all be enclosed within a vacuum chamber held at a moderately low pressure. (Extremely low pressures are not used because outgassing from the sample surfaces can have undesirable effects.) Air in the vacuum chamber, which absorbs infrared radiation at some wavelengths, is replaced with helium, nitrogen, or some other gas that does not. To enhance radiative heat transfer to the sample material from the interior walls of chamber 42, these walls are coated with a high emissivity material.

Preferably, slot 48 is constructed with a geometry such that the slot does not become a significant source of emissions that would reflect from surface 52, by forming the slot with tapering side walls 54, which are highly specularly reflective. In addition, side walls 54 are preferably maintained cold compared to sample 40. It should also be noted that the volume within chamber 42 acts very nearly like a blackbody cavity. To prevent blackbody radiation from illuminating surface 52 of the sample, side walls 54 are preferably extended towards surface 52 to leave as small a gap as is reasonably feasible. Since the gap cannot be eliminated entirely, the slot is made longer (in the direction of sample motion) than the view length required by the spectroradiometer. Each end of the field of view is at a sufficient distance from the gap on either side so that blackbody illumination within the field of view is negligible.

Figure 4:
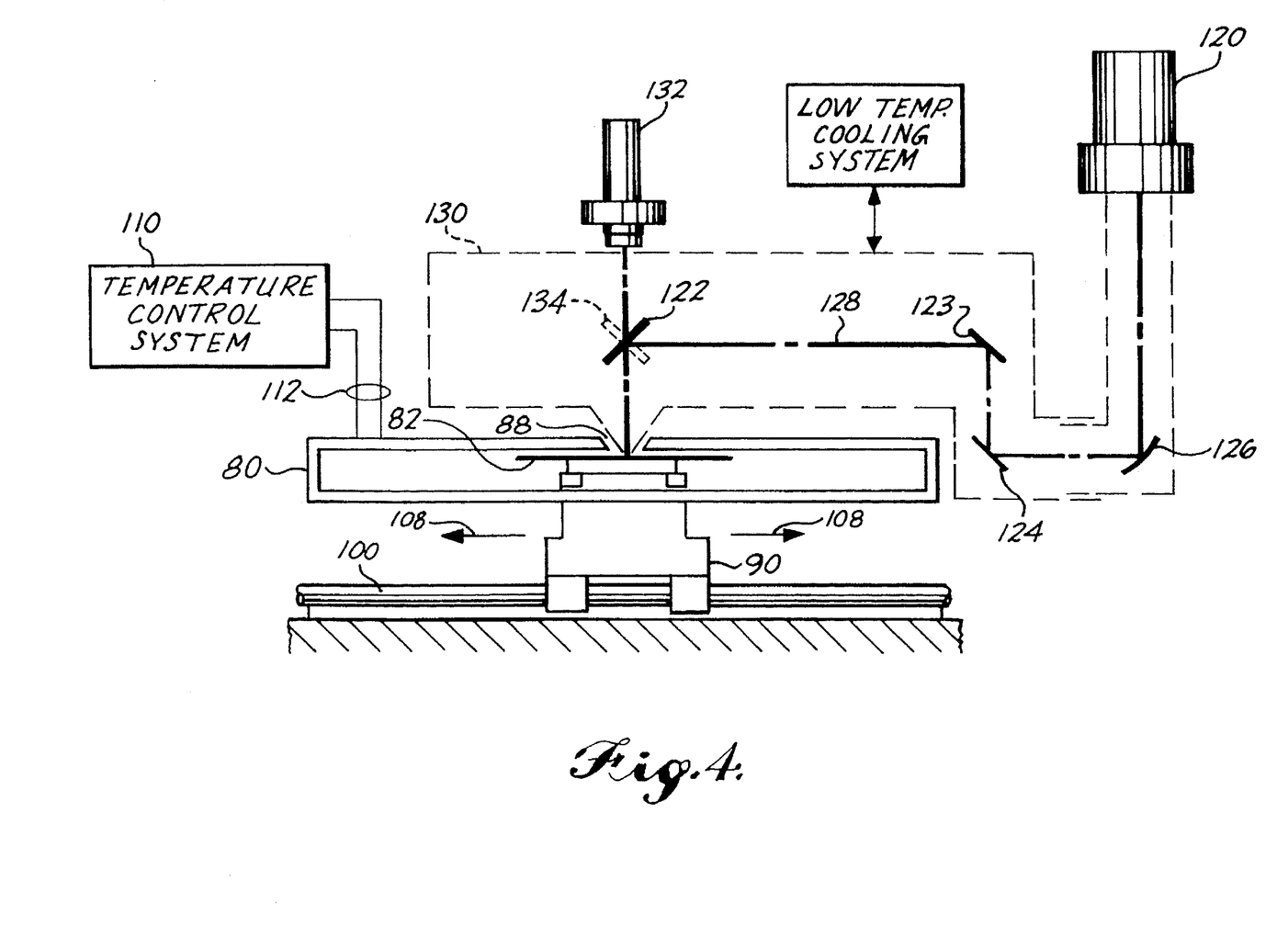
FIG. 4 is a schematic side elevational view of an apparatus for determining emissivity in accordance with the present invention.
Figure 5:
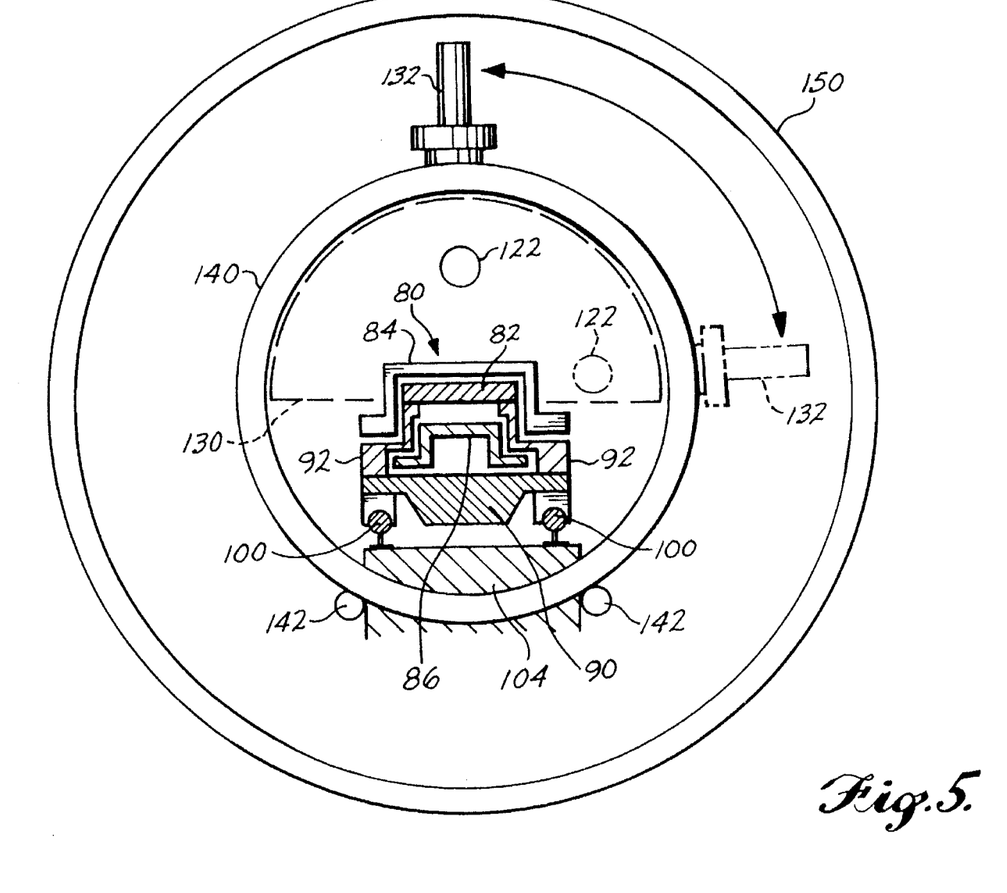
FIG. 5 is a schematic cross-sectional view of the apparatus of FIG. 4.

FIGS. 4 and 5 provide further details of a preferred apparatus for carrying out emissivity measurements according to the present invention. The apparatus includes a thermal chamber 80 that contains a sample 82 of the material whose emissivity is to be measured. As shown in FIG. 5, chamber 80 comprises an upper member 84 and a lower member 86 that are sized and positioned in a nested arrangement, such that sample 82 is between the upper and lower members. The sample is supported from a carder 90 via a pair of arms 92 containing guard temperature controllers (not separately identified) that extend between the upper and lower members.

It is not necessary that thermal chamber 80 be split into upper member 84 and lower member 86. In the preferred embodiment, this configuration was used for design convenience, to simplify the sample motion drive apparatus. The gaps between upper member 84 and lower member 86 (which are much smaller than indicated in the schematic of FIG. 5) do not compromise thermal stability within chamber 80 because gas pressure is low enough to prevent thermal convection.

Carder 90 is supported on a pair of rails 100 that in turn are supported on a base 104. Movement of the carder and sample along the movement direction (symbolized by arrows 108 in FIG. 4) is effected by means of cables (not shown) attached to both ends of the carrier, and suitable electromechanical actuators (also not shown) for operating the cables. Upper member 84 of chamber 80 includes a slot 88 through which the sample may be viewed from above. Preferably, slot 88 extends the full width of the upper member (perpendicular to movement direction 108), so that the sample can be viewed from the side at different angles, as described below.

The walls of chamber 80 are maintained at a predetermined temperature by a temperature control system 110 that is coupled to chamber 80 via conduits 112. Conduits 112 communicate with conduits (not shown) in the walls of chamber 80 and in the walls of blackbody reference 132. The temperature control system also to includes several temperature sensors (not shown) positioned in the walls of chamber 80. The temperature control system pumps a fluid through the conduits in the chamber walls, and controls the temperature of the fluid so that a predetermined temperature is attained in chamber 80 and in blackbody reference 132.

The emissivity of sample 82 is measured by a spectroradiometer 120 via relay optics comprising mirrors 122–124 and a converging mirror 126. The relay optics images a portion of the sample surface through slot 88 onto the optical input port of the spectroradiometer via an optical path 128. To prevent extraneous thermal radiation from entering the spectroradiometer, the relay optics and optical path 128 are enclosed in a measurement shroud 130 whose walls are held at as low a o temperature as practical, to minimize thermal radiation. Preferably, liquid nitrogen is pumped through conduits in the walls of the measurement shroud.

Referring again to FIGS. 1A and 1B, it will be recalled that to determine the emissivity of a sample, it is necessary to determine the radiation emitted by the sample (curve 12), and to compare such radiation to the radiation emitted by a blackbody at the same temperature (curve 14). These two measurements should preferably be made close in time to one another, to avoid problems with temperature drift in any part of the system. To permit such measurements, the apparatus shown in FIGS. 4 and 5 includes a blackbody radiation source 132 positioned on the opposite side of mirror 122 with respect to slot 88. Mirror 122 is mounted so that it is pivotable about an axis normal to FIG. 4, to and from a phantom position 134. In the phantom position, the mirror deflects radiation from blackbody radiation source 132 onto optical path 128, for measurement by the spectroradiometer. The instruments shown in FIGS. 4 and 5 can therefore be rapidly switched between a configuration in which the spectroradiometer measures radiation coming from the sample through slot 88, and radiation from the blackbody radiation source. A simple radiometer can be used in place of a spectroradiometer 120 if it is not necessary to measure the spectral components of the radiation.

In order to permit measurements of emissivity from angles other than normal incidence, the relay optics and blackbody source are preferably mounted such that they can be rotated as a unit about an axis that lies on the upper surface of sample 82. This rotation may be accomplished, as shown in FIG. 5, by forming measurement shroud 130 in a half cylindrical shape, and by mounting the relay optics and blackbody source to a cylindrical drum 140 that is positioned such that the central axis of the cylindrical drum lies on the upper surface of sample 82. Drum 140 may be mounted by an arrangement that includes rollers 142, such that the drum may be rotated up to 90° to either side of the straight-up, twelve o'clock position, to permit emissivity measurements on sample 82 from angles close to 90° from normal incidence. The beam path axis between mirrors 124 and 126 coincides with the cylindrical drum axis so that the spectroradiometer does not have to rotate. The present embodiment of this invention includes an s and a p polarizer plate (not shown), each of which can be remotely positioned into the beam path between mirrors 124 and 126.

In the discussion above, emphasis has been placed on obtaining an isothermal sample condition, to produce research quality emissivity measurements. However nonopaque materials are sometimes used in applications where a temperature gradient is present. The gradient arises from surface heating by convection or conduction, with the heat passing to a lower temperature internal sink. An example would be a composite skin on a high speed air vehicle. Small changes in the approach described above can allow spectral radiance (not emissivity) measurements of a material having a prescribed temperature gradient.

A specified gradient is obtained by suppressing radiative heat transfer and enhancing conductive heat transfer, while cooling the back side of the sample. It is desirable to suppress radiative heat transfer so that, for non-opaque samples, all significant thermal energy exchange occurs at the sample surface. Radiative heat transfer is suppressed by making the inner walls of upper member 84 highly reflective, as opposed to highly emissive. Conductive heat transfer is enhanced by filling the vacuum chamber in which the apparatus is placed with helium gas, which has a much higher thermal conductivity than, say, nitrogen, and a Grashof number two orders of magnitude lower, so that chamber pressure can be increased substantially while still avoiding thermal convection currents.

Since a temperature gradient exists, there are the same problems in measuring surface temperature as discussed above. However, these same problems also exist in the real life condition that is being simulated. In real life, the material back side temperature might be known, along with heat flux through the material. Surface temperature is estimated based on measured heat flux and measurements of material thickness and thermal conductivity. Thus, the temperature condition of a material with a temperature gradient applied using an apparatus such as that shown in FIGS. 4 and 5 is probably known as accurately as the temperature condition of a material in a real life temperature gradient situation.

While the preferred embodiment of the invention has been illustrated and described, it will be appreciated that various changes can be made therein without departing from the spirit and scope of the invention as defined by the following claims.

The embodiments of the invention in which an exclusive property or privilege is claimed are defined as follows:

1. An apparatus for determining the emissivity of a sample at a selected temperature based on thermal radiation emitted by the sample, comprising:

a chamber for the sample, the chamber comprising a plurality of walls including a first wall containing an observation port through which the sample within the chamber may be viewed, the chamber being maintained in an environment substantially colder than the chamber, the sample being mounted for movement along a movement axis within the chamber past the observation port;

means for maintaining the walls of the chamber at a wall temperature sufficient for the sample to reach the selected temperature; and means for measuring the spectrum of radiation for a range of wavelengths emitted outwards through the observation port by the sample as the sample is moved past the observation port from which the emissivity of the sample is determined.

2. The apparatus of claim 1, wherein the length of the observation port along the movement axis is substantially less than the length of the sample along the movement axis.

3. The apparatus of claim 1, wherein margins of the observation port control a radiometric exposure of the sample, said margins having:

(a) specularly reflective surfaces;

(b) a geometry preventing a direct reflection of sample emissions onto the sample.

4. The apparatus of claim 1, wherein the means for measuring the spectrum comprises a spectrometer, and relay optics for coupling radiation emitted outwards through the observation port along an optical path to the spectrometer.

5. The apparatus of claim 4, in which the relay optics are mounted for rotation about the movement axis, to thereby permit measurement of radiation emitted outwards from the sample at non-normal incidence angles.

6. The apparatus of claim 4, further comprising a shroud enclosing the relay optics and the optical path, and means for maintaining the shroud at a low shroud temperature compared to the wall temperature at which the walls of the chamber are maintained.

7. The apparatus of claim 1, further comprising a blackbody radiation source, wherein the means for measuring the spectrum comprise means for alternately measuring the radiation emitted outwards through the observation port by the sample, and radiation emitted by the blackbody radiation source.

8. The apparatus of claim 1, wherein the means for measuring the spectrum comprises a spectroradiometer for measuring the spectrum of the radiation.

9. The apparatus of claim 1, wherein the means for measuring the spectrum comprise a radiometer.

10. The apparatus of claim 1, wherein an interior surface of the walls of the chamber has an emissive coating to encourage an isothermal condition in the sample.

11. A method for determining the emissivity of a sample at a selected temperature based on the spectrum of thermal radiation emitted by the sample at a selected temperature, the method comprising:

positioning the sample in a chamber comprising a plurality of walls including a first wall containing an observation port through which the sample within the chamber may be viewed;

maintaining the chamber in an environment that is substantially colder than the chamber;

maintaining the walls of the chamber at a wall temperature for a period of time sufficient to permit the sample to reach the selected temperature, moving the sample along a movement axis within the chamber past the observation port at a speed such that an exposure time of any point on the sample surface to the environment beyond the observation port is limited;

measuring the specturm of radiation for a range of wavelengths emitted outwards through the observation port by the sample as the sample is moved past the observation port and determining the emissivity of the sample based on the measured spectrum of radiation.

12. The method defined in claim 11, including positioning the sample out of registration with the observation port while maintaining the walls of the chamber at the wall temperature for the period of time sufficient to permit the sample to reach the selected temperature prior to moving the sample along the movement axis within the chamber.

13. The method defined in claim 11, including maintaining the sample stationary relative to the walls of the chamber while maintaining the walls of the chamber at the wall temperature for the period of time sufficient to permit the sample to reach the selected temperature prior to moving the sample along the movement axis within the chamber.

14. The method defined in claim 11, including maintaining a prescribed temperature gradient through the sample while measuring the spectrum of radiation.

15. The method defined in claim 11, including maintaining the chamber in an environment at a moderately low pressure while moving the sample and measuring the spectrum.

* * * * *

UNITED STATES PATENT AND TRADEMARK OFFICE
CERTIFICATE OF CORRECTION

PATENT NO.  :  5,505,543

DATED       :  April 9, 1996

INVENTOR(S) :  V.T. Webbeking et al.

It is certified that error appears in the above-indentified patent and that said Letters Patent is hereby corrected as shown below:

| COLUMN | LINE | |
|---|---|---|
| 3 | 45 | After "measured." delete "o" |
| 4 | 26 | After "48" insert --,-- |
| 4 | 53 | After "end" delete "o" |
| 5 | 59 | "carder" should read --carrier-- |
| 6 | 6 | "Carder" should read --Carrier-- |
| 6 | 7 | "carder" should read --carrier-- |
| 6 | 23 | "After "also" delete "to" |
| 6 | 37 | "After "a" delete "o" |
| 8 (Claim 11, | 52 line 3) | Delete "at a selected temperature" |

UNITED STATES PATENT AND TRADEMARK OFFICE
CERTIFICATE OF CORRECTION

PATENT NO. : 5,505,543

DATED : April 9, 1996

INVENTOR(S) : V.T. Webbekin et al.

It is certified that error appears in the above-indentified patent and that said Letters Patent is hereby corrected as shown below:

| COLUMN | LINE | |
|---|---|---|
| 9 (Claim 11, line 21) | 4 | After "port" insert --;-- |

Signed and Sealed this

Sixth Day of August, 1996

*Attest:*

BRUCE LEHMAN

*Attesting Officer*       Commissioner of Patents and Trademarks